Feb. 7, 1956 F. C. WILLIAMS 2,734,186

MAGNETIC STORAGE SYSTEMS

Filed Feb. 27, 1950 6 Sheets-Sheet 1

F. C. Williams
*Inventor*

By Moore and Hall
*Attorneys*

F. C. Williams
*Inventor*
By Morse and Hall
*Attorneys*

F. C. Williams
*Inventor*
By Moore and Hall
*Attorneys*

Feb. 7, 1956 F. C. WILLIAMS 2,734,186

MAGNETIC STORAGE SYSTEMS

Filed Feb. 27, 1950 6 Sheets-Sheet 4

F. C. Williams

*Inventor*

By Moore and Hall

*Attorney*

MAGNETIC STORAGE SYSTEMS

Filed Feb. 27, 1950

F. C. Williams
*Inventor*
By Moore and Hall
Attorneys

Feb. 7, 1956 F. C. WILLIAMS 2,734,186

MAGNETIC STORAGE SYSTEMS

Filed Feb. 27, 1950 6 Sheets-Sheet 6

F. C. Williams
*Inventor*

By [signature]
*Attorneys*

United States Patent Office 2,734,186

Patented Feb. 7, 1956

2,734,186

MAGNETIC STORAGE SYSTEMS

Frederic C. Williams, Timperley, England, assignor to National Research Development Corporation, London, England, a corporation of Great Britain Application February 27, 1950, Serial No. 146,446

Claims priority, application Great Britain March 1, 1949

8 Claims. (Cl. 340—174)

Figure 1:
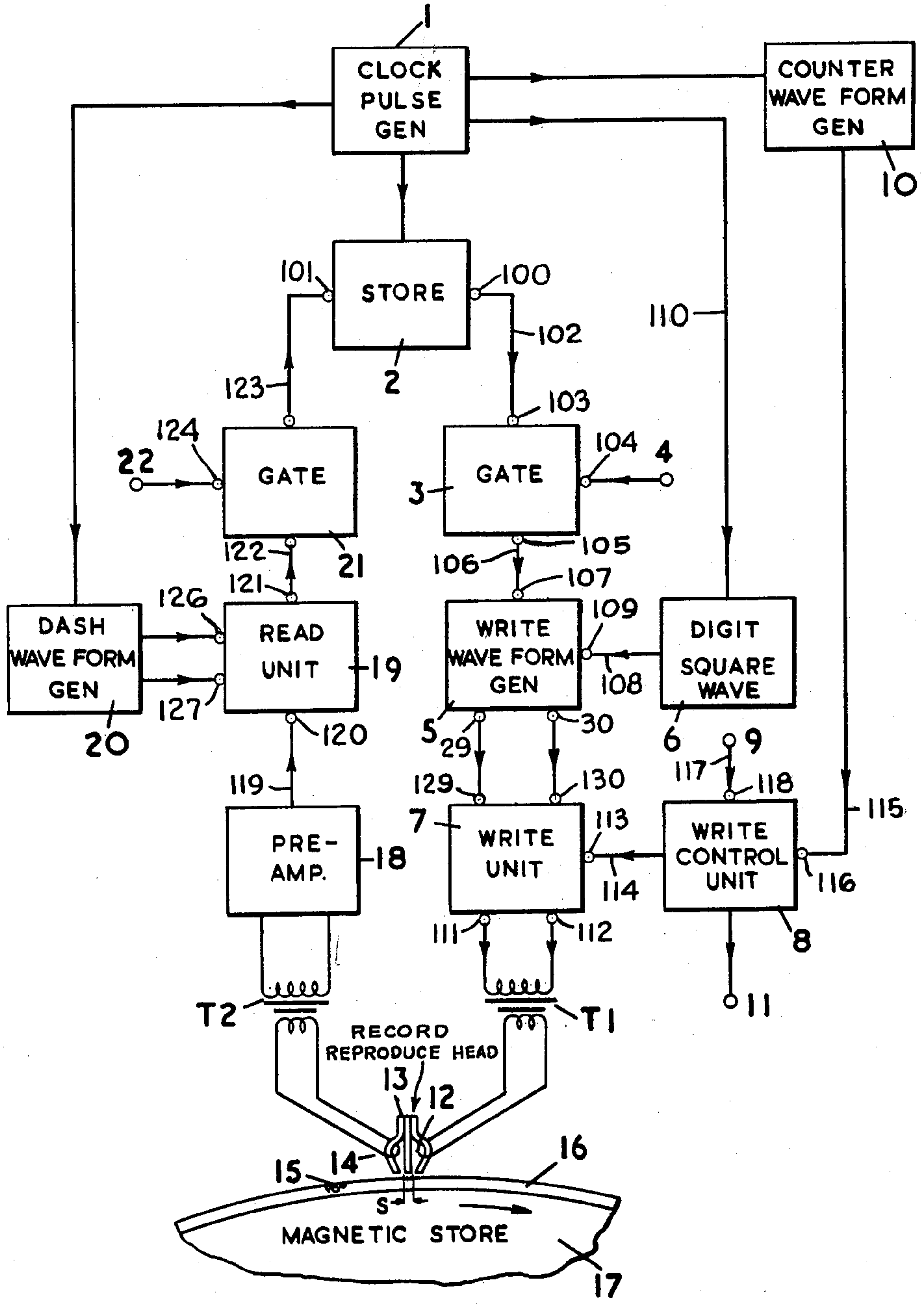

This invention relates to magnetic storage systems which store electrical signals on a magnetic medium and in which each discrete electrical signal may represent one of two possible significances.

The electrical signals, for the storage of which the system and apparatus of the present invention is peculiarly adapted, may be pulse signals representative of binary-digital information and may, for example, represent binary-digital numbers in a digital computing system. Such pulse signals which are required to represent the two significances "0" and "1" may be of various forms, for example "0" and "1" may be represented by pulses of similar duration but of opposite polarity respectively, or the two significances may be represented by pulses of like polarity but of differing durations. More usually however the significance "1" is represented by a pulse of given duration while the significance "0" is represented by the absence of such a pulse.

When a pulse train representation of such digital data is stored upon any recording medium, magnetic or otherwise, it is highly desirable that the characteristic or characteristics of the stored record which is employed to define the significance of each element upon reproduction of the stored data should be effective at accurately determinable instances of time.

This is especially applicable to electronic computing machines which utilize a master timing device such as a clock pulse generator to control the operation of the machine. One example of such a machine is described in United States patent application Ser. No. 141,176, filed January 30, 1950, by F. C. Williams et al. In such machines, which invariably utilize a high-speed or temporary storage system from which digit signals can be made available for use in a computation or similar process within a time, commonly called access time, which is much less than the access time for magnetic stores, it is particularly desirable that the instants at which signals are made available on being reproduced from the magnetic store for use in a computation etc., are in synchronism with the operation rhythm of the machine as a whole as set by the clock pulse generator.

It is similarly highly desirable that the accurately determined instants of time at which the digit recording signals are made available should not be effected by variations in the onset of the originating control signals. The conversion of machine-type digit signals into a form suitable for energising the means for effecting their recording on a magnetic medium involves the use of recording (writing) circuits while the conversion of output signals obtained from the magnetic medium into machine-type digit signals involves reproducing (reading) circuits. Both of these circuits will possess inherent time delays and in order to eliminate varying timing errors due to these circuits and due to any variation of the timing of the originating machine-type digit signals it is necessary to time the recording of signals on and reproduction of signals from the magnetic medium by a train of pulse signals derived from and in synchronism with the master clock pulse generator of the machine.

As the reproduction of magnetization patterns requires relative movement between the recording medium and reproducing head the recording medium is almost invariably the curved surface of a rotatable wheel or drum and the signals are stored on discrete lengths of a number of circumferential tracks.

United States Patent No. 2,652,554 granted September 15, 1953 (application Ser. No. 146,445, filed February 27, 1950) by F. C. Williams et al. describes arrangements for synchronising the rotation of a recording drum on which the digit signals are stored so that the rate or frequency at which signals are recorded on and reproduced from the recording medium on the surface of the drum by recording and pick-up heads is equal to the rate or frequency of the rhythmic operation of the machine. A constant and predetermined time relationship can thus be set up between an operation in the magnetic store and a corresponding operation in the rest of the machine and this time displacement can be arranged to be equal to and in opposite sense to the inherent delays occurring in the process of transferring digit signals to and from the magnetic store so that digit signals can be written into and read out of the store in synchronism with the operation of the rest of the machine.

Thus so that a synchronised train of digit signals may be produced, it is essential that both digits are represented by magnetization patterns capable of reproducing signals at accurately determinable instances or short periods of time. It would be insufficient for digits of one kind (for example "1's") to be represented by a magnetization pattern and digits of the other kind ("0's") to be represented by a state of zero magnetization, as upon reproduction no definite indication would be produced in response to a stored "0" and the interpretation of a series of "0" digits would be a matter of considerable difficulty. Furthermore if a new set of digit signals were required to be recorded in place of a set already there, the original signals would have to be erased as a "0" in the new set would not cancel a "1" in the original set.

It is therefore an object of the invention to provide a magnetic storage system for the recording of electrical signals in which the electrical signals of either of two significances are both recorded as definite patterns of magnetization of a magnetic recording medium, and in which the position or timing of the patterns of the stored magnetic information which characterise the significances of the electrical signals is unaffected by minor variations in the timing of the recording signals, and likewise, the timing of electrical signals obtained from these recorded patterns is similarly unaffected.

A number of different magnetization patterns could be employed but it should be noted that it is not sufficient merely for signals of one kind to be represented by a conditions of magnetization in one sense and for signals of the other kind to be represented by a condition of magnetization in the opposite sense as in this case the temporal limits of a signal of one kind next to one or between two signals of the same kind could not be accurately determined, and variations in the time of onset of the signals would make the system unreliable.

It is therefore proposed to use patterns significant of a signal of either kind in which in each case the condition of magnetization i. e. the orientation of the magnetic field undergoes an abrupt reversal at some point along the length of the strip of the recording medium allocated to the signal. Thus as the voltage induced in a coil of wire interlinked with a pick-up head is proportional to the rate of change of flux encircling the coil these abrupt changes in the condition of the magnetization stored in the recording medium when moving past the pick-up head at a uniform speed will produce voltage peaks in the coil of wire which will be the most definite indication of the presence or nature of a signal and will therefore be used to produce the output train of signals from the magnetic recording system.

This abrupt reversal in the orientation of the magnetization is arranged to be timed by the master timing device or clock pulse generator so that the timing of the output train of signals is controlled by this device. It is necessary, in order to carry this into practical effect, to arrange that this abrupt reversal takes place at some intermediate point along the discrete length of the recording track allocated to the recording of the signal so that if the time of onset of the signal were to be somewhat late the abrupt reversal could still take place in synchronism with the master timing device.

According to the present invention, therefore, in a magnetic storage system for storing electrical signals of one of two kinds, each signal is stored as a predetermined pattern of magnetization within a discrete length of a track on a magnetic recording medium, the magnetization being in a direction parallel with the length of the track and polarized, for a first type of signal, in a first direction for a first portion of the discrete length followed, after an abrupt reversal at some intermediate point along the discrete length, by polarization in a second and opposite direction for the remainder of the discrete length whereas for the other kind of signal, the polarization of the first portion is in the second direction, followed after an abrupt reversal, by polarization in the first direction. According to a feature of the invention, a master timing device which generates a train of regularly occurring clock signals is arranged to control the recording means so that the abrupt reversals of the polarization direction of the magnetization occur at regular intervals along the recording track independent of the actual position of the commencement and termination of each of the discrete lengths.

Figure 2:
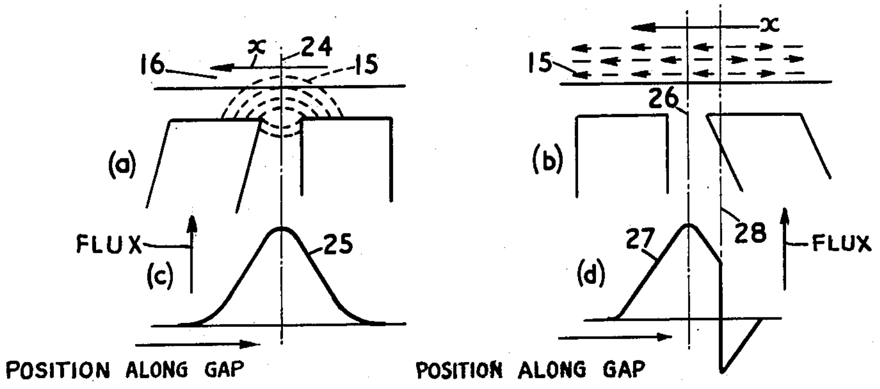
Figure 3:
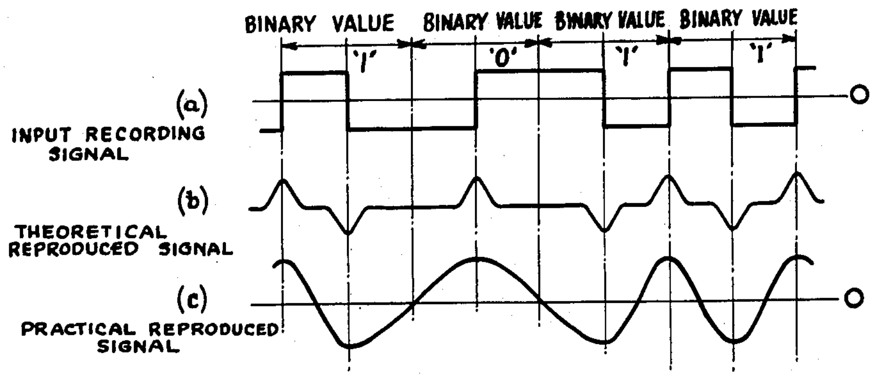
Figure 4:
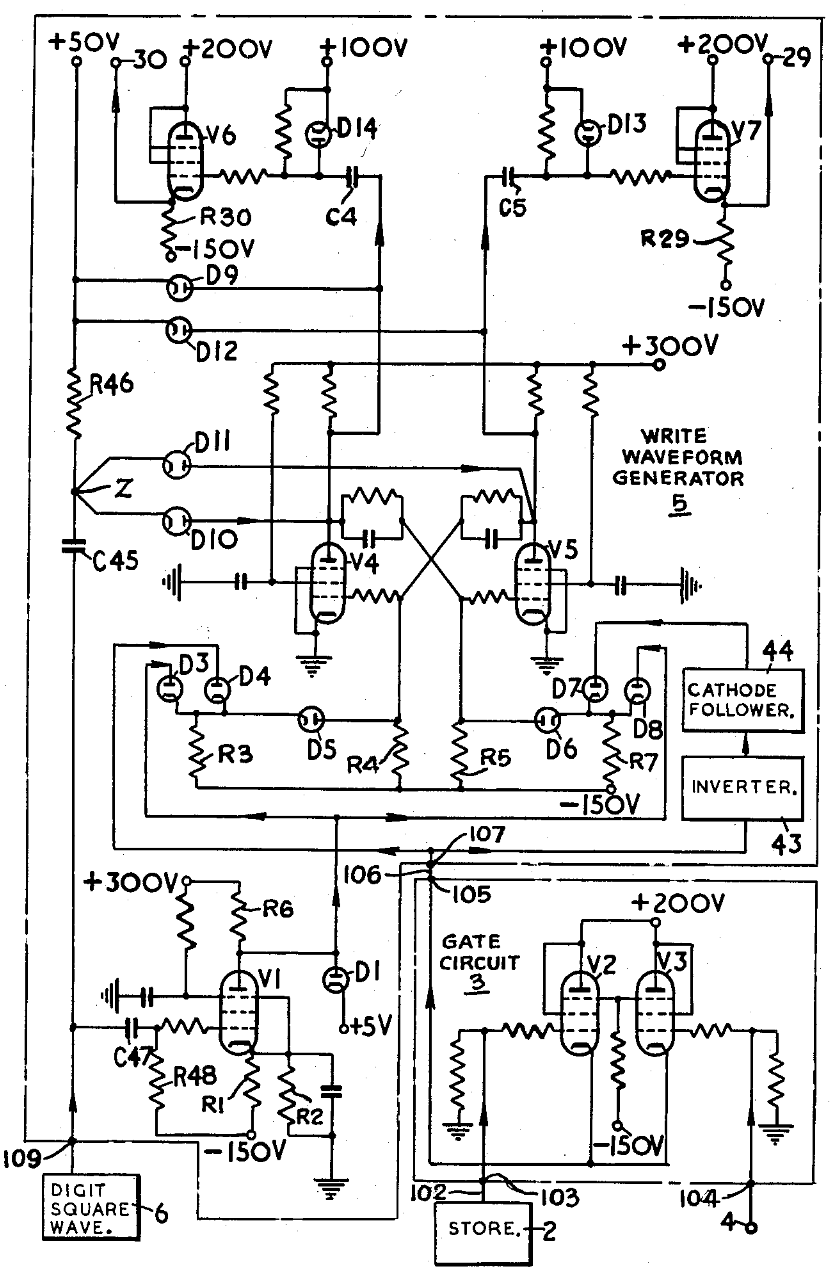
Figure 5:
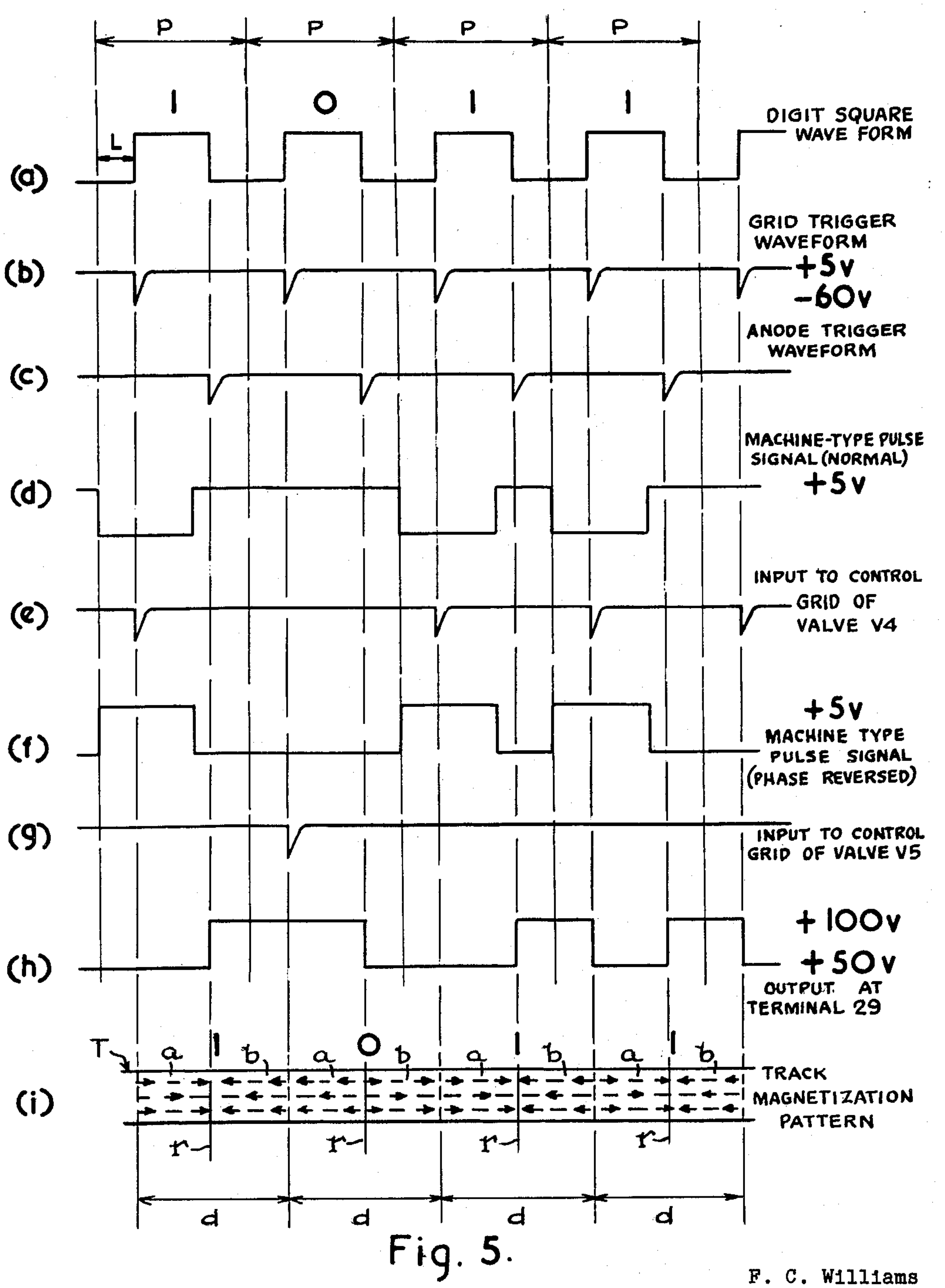
Figure 6:
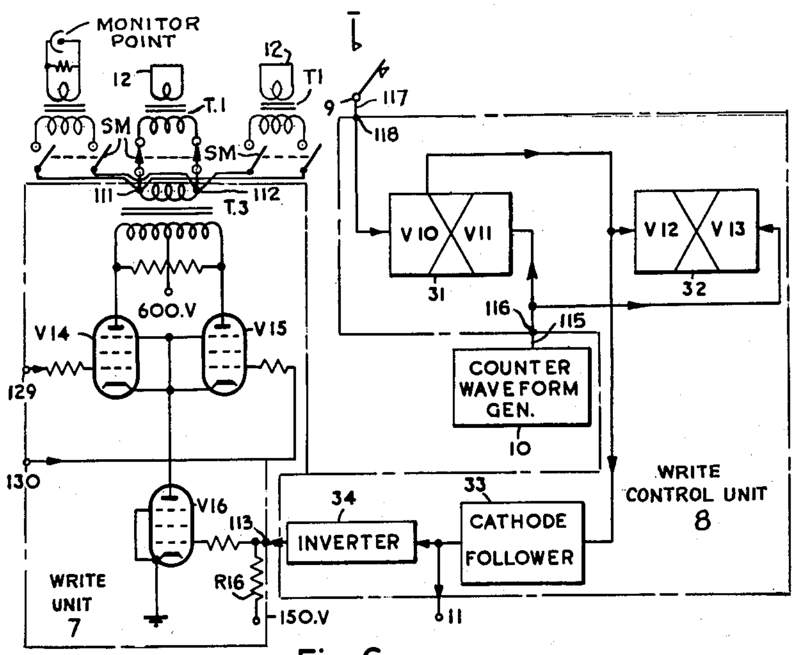
Figure 8:
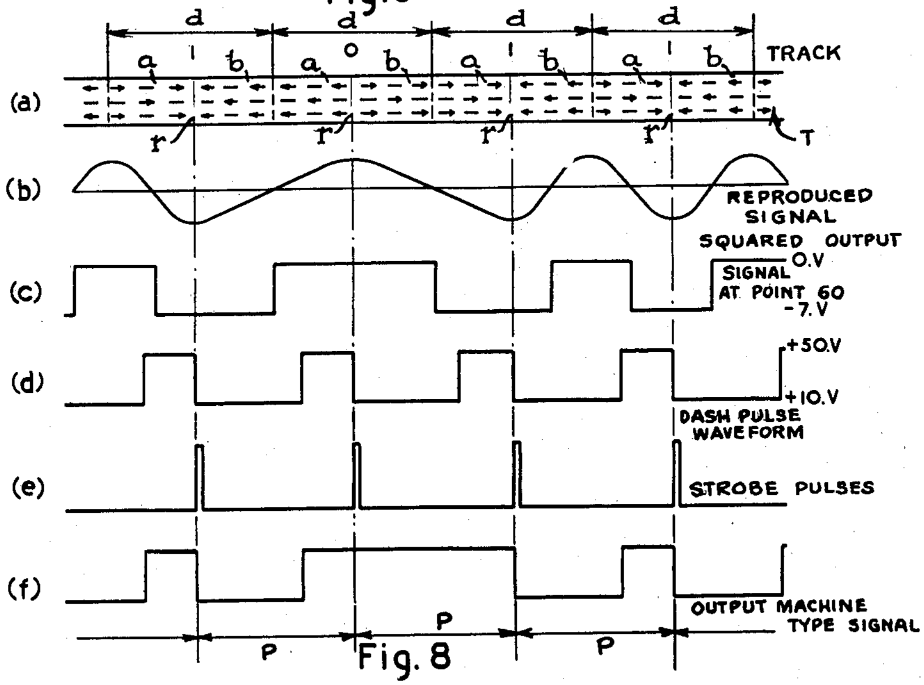
Figure 7:
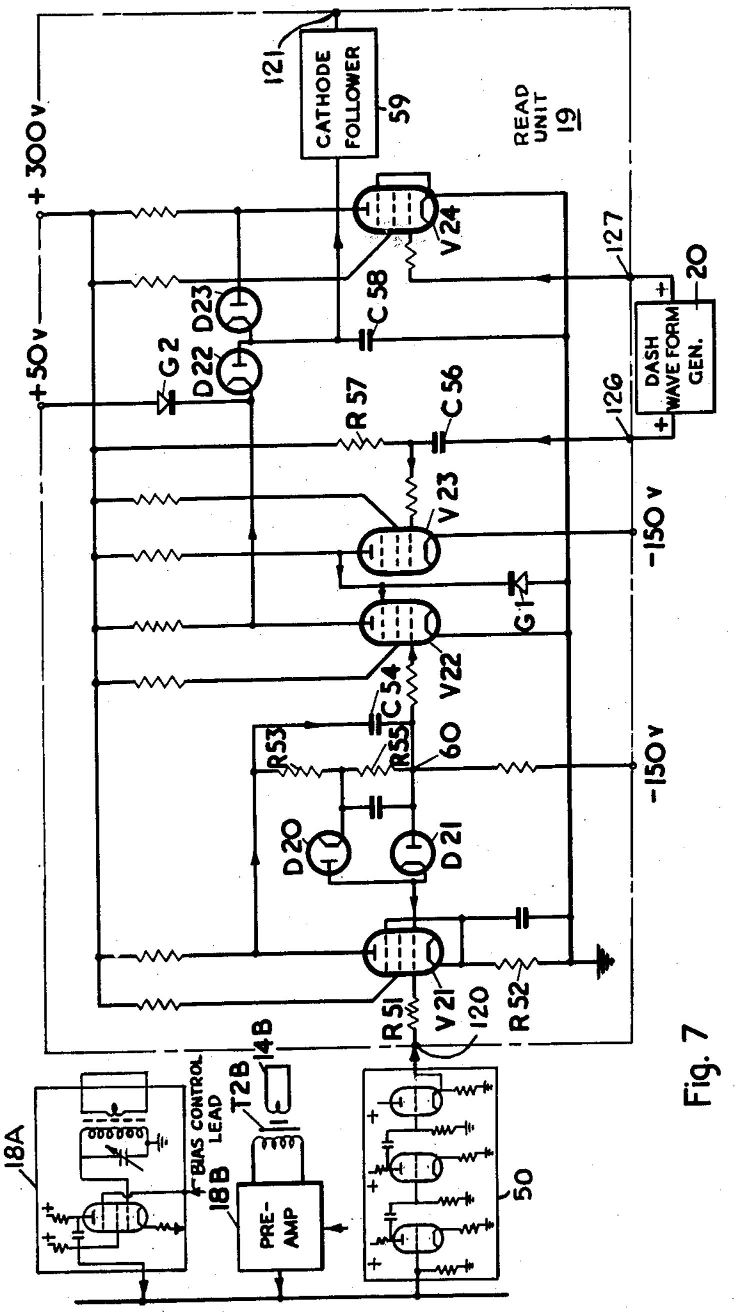

The invention will be more readily understood from the following description of a particular magnetic storage system according to the invention which is arranged to form the magnetic subsidiary data store of a binary digital computing machine. The description is given with reference to the accompanying drawings in which:

Figure 1 shows the main parts of a magnetic storage system operating as part of a digital computer, Figure 2 shows details of the recording and pick-up heads, Figure 3 shows various waveforms illustrating the method of storing signals on the magnetic recording medium, Figures 4 and 6 show details of circuit arrangements used for writing signals onto the magnetic recording medium, Figure 5 shows waveforms occurring at various parts of the circuits shown in Figure 4, Figure 7 shows details of the circuit arrangements used for reading signals stored on the magnetic recording medium, while Figure 8 shows waveforms occurring at various parts of the circuits shown in Figure 7.

The form of the magnetic recording which characterises the present invention is shown diagrammatically in Fig. 5 (*i*) and Fig. 8 (*a*), from which it can be seen that in each discrete length *d* of a magnetic recording track T which is assigned to the recording of a single signal element (which may be of one or the other of two kinds, for instance, representative of the binary digit values "1" or "0") there is an initial or first portion *a* with magnetization polarized in one direction along the length of the track and a following or second portion *b* with magnetization polarized in the opposite direction, the change of polarization direction taking place abruptly at an intermediate point *r* in each discrete length. The respective directions of magnetization polarization in the portions *a* and *b* serve to represent the kind of signal which is recorded. Thus, in the example shown, the binary digit value "1" is recorded by arranging the magnetization of the first portion *a* of a discrete length to be polarized in a first direction denoted by arrow heads directed to the right and followed, after abrupt reversal at the intermediate point *r*, by magnetization of the second portion *b* polarized in a second and opposite direction denoted by arrow heads directed to the left. Signals of the other kind denoting binary value "0" are, on the other hand, recorded by arranging for the polarization to be in the second direction in the first portion *a* and in the first direction in the second portion *b* of the related discrete length *d* of the track T.

The manner in which the above described method of magnetic recording may be carried out and used to reproduce signals similar to those which originated the recording and in accurate time synchronism with a digit signalling rhythm with which a device which provided the initial recording signals and to which the subsequently reproduced signals are supplied, has been continuously maintained will now be described. The illustrative embodiment relates to the application of the invention to a magnetic type subsidiary storage system in a binary digital computing machine which operates in the series mode with its number and instruction word signals constituted by electric pulse signal trains each comprising a predetermined number group of sequential equi-length digit-intervals and wherein the presence of a pulse during any of such digit-intervals indicates the binary value "1" and the absence of a pulse during any such digit-interval denotes the binary value "0". Such method of binary number signalling is already known as also are various forms of binary digital computing machines employing such form of number and instruction word representation. Examples of such pulse form signalling and machines employing it may be found in the literature reference "Proceedings of the Institute of Radio Engineers Inc.," December 1948, pp. 1452–1460 in an article by West and DeTurk entitled "A digital computer for scientific applications," and in various publications by the Moore School of Electrical Engineering, University of Pennsylvania, entitled "Progress Reports on the Edvac," dated June 30, 1946, and subsequently.

Referring now to Fig. 1, which shows in block schematic form the various elements of a magnetic recording system according to the invention together with certain elements of the associated computing machine, 2 indicates the normal data word store of the computing machine from which pulse train signals to be recorded in the magnetic store are derived and to which similar pulse train signals reproduced from the magnetic store are supplied. Such store 2 may be of any convenient and known kind which operates in the serial mode and at a set and predetermined digit signalling speed or rhythm. For example, it may be a device of the well known mercury delay line type as described in the aforesaid literature references or alternatively and more conveniently, of the electrostatic cathode ray tube type as described in the aforesaid copending United States patent application Ser. No. 141,176 by F. C. Williams et al. The signal output or read-out terminal of such store is indicated at 100 and the signal input or write-in terminal at 101.

As already stated such store devices operate at a set and rigidly controlled digit signalling speed or rhythm and this is controlled, again as in the known prior art machines, by a stable frequency oscillator which is usually known as the "Clock" and is denoted in Fig. 1 by the clock pulse generator 1. Such generator may be of any suitable form and is usually a crystal controlled thermionic valve oscillator and associated pulse-squaring means and operating at the digit-interval recurrence frequency of the word signal trains, for example, at a frequency of 100 kilocycles/second when each digit-interval is of 10 microseconds duration. The output from such clock pulse generator 1 comprises a continuous symmetrical square pulse waveform, e. g. of alternate 5 microsecond positive and negative pulses.

The form of the number word signal used within the computing machine is illustrated in Fig. 5(*d*) and from this it will be seen that a digit of binary value "1" is signalled by a negative-going square pulse during any digit-interval *p* whereas a digit of binary value "0" is signalled by the absence of such a pulse within any such digit-interval *p*. The "1"-representing pulse commences at the beginning of each digit-interval time and persists for rather more than half the digit-interval, e. g. for 6 microseconds of the 10 microseconds digit-interval. Such digit signalling pulses are conveniently derived from a continuously operating source indicated as the Dash waveform generator 20 which comprises any suitable form of square pulse generator controlled in its operation frequency by the output waveform from the clock pulse generator 1. Such generator 20 may, for example, be a mono-stable multivibrator circuit of the kind described in "Waveforms," vol. 19, M. I. T. Radiation Laboratory Series, McGraw Hill, 1949, pp. 166–170. The Dash waveform generator 20 provides two anti-phase outputs, one as shown in Fig. 8(*d*) and the other a phase-inverted version which is not shown. Any "1"-representing pulse in a machine word signal is effectively a selected one of such Dash pulses.

Computing machines employing data store devices of the kind above referred to, operates at a rhythm which is made up of a sequence of so-called minor cycles or beats, each of which is of a time duration sufficiently long to accommodate the number of sequential digit-intervals needed to express the number of digits which are included in the basic length of data word around which the machine is designed. Thus if the machine is designed to operate with 40-digit binary numbers each minor cycle or beat will be at least 40 digit-intervals in duration and in machines employing the cathode ray tube storage device each beat interval is rather longer, say 45 digit-intervals duration to allow for the necessary fly-back motion of the cathode ray tube beam. Such minor cycles or beat intervals need to be accurately defined in order that the various sequential digit-intervals subsequent to the commencement of each minor cycle or beat shall have the correct binary power significance, while it is necessary also to define each complete operation cycle of the store 2. Thus, in the case where store 2 is a delay line holding 32 separate word signals, a waveform for marking each 32 word time interval is needed. Such a waveform, hereinafter called the counter wave, is provided, in the example illustrated, from a counter waveform generator 10 which is supplied with the frequency controlled clock pulse output from the clock pulse generator 1 and operates, first to count the clock pulses into groups of chosen number equal to that of the chosen minor cycle or beat period say, 45, and secondly to count such beat intervals into groups of the required number and then to provide a suitable output counter waveform which defines each of such minor cycle groups. Such counter waveform generator 10 may comprise any conventional form of pulse counting circuit arrangement for providing a minor cycle defining wave, e. g. one or more circuits of the Phantastron type as described in the aforesaid "Waveforms" reference at pages 477–582 and in United States Patent No. 2,549,874, granted April 24, 1951, to F. C. Williams. The counter wave may be a square waveform of symmetrical positive and negative pulses each of a duration equal to the number, e. g. 32, minor cycles in each operation cycle of the store 2. Such counter wave may be generated by a conventional counter chain of bi-stable multivibrator circuits the first of which is triggered by the aforesaid minor cycle defining wave.

The magnetic storage device consists of a drum 17 of non-magnetic material, such as brass, around the peripheral surface of which is provided the magnetic recording medium consisting of an electroplated nickel layer 16. The drum 17 is continuously rotated by a motor, not shown, so that the recording medium is moved relatively to a stationary head 13 which performs the joint functions of effecting both recording (writing) and reproducing (reading). For such joint function the head 13 is provided with two separate magnetic flux paths defining two separate magnetic flux gaps, one flux path being linked by an energising coil 12 and the other by an energised coil 14. The coil 12 is used for recording purposes and derives its energising current from a transformer T1. The other coil 14 is for reproducing purposes and delivers its output current to a transformer T2.

The output signals from store 2 which are in the normal machine-type form as shown in Fig. 5(*d*) are applied from terminal 100 over lead 102 to one input terminal 103 of a gate device 3 whose other input terminal 104 is supplied with a control voltage from a source 4. The gate device 3 whose precise form will be described in detail later, is of the coincidence type whereby the passage of such store signals from lead 102 is blocked unless an appropriate potential is applied to terminal 104 from source 4. When such potential is applied the machine-type signals from store 2 pass through the gate 3 to its output terminal 105 and thence by lead 106 to the input terminal 107 of a write waveform generator 5.

The write waveform generator 5, whose construction will be described in detail later, is controlled in its operation by a waveform output from a digit square wave generator 6 applied over lead 108 to terminal 109 of the generator 5. The digit square wave generator 6 provides a square wave output as shown in Fig. 5(*a*) and which consists of a balanced square pulse waveform similar to the digit-interval or clock pulse waveform of generator 1 but with the leading edges of each positive-going square pulse slightly delayed with respect to the commencement of each digit-interval *p* by an amount L. The amount L of this delay is made adjustable for a purpose which will be explained later. The digit square wave generator 6 is of any convenient form such as a conventional multivibrator type circuit whose triggering is controlled by the clock waveform applied over lead 110 from the clock pulse generator 1 through suitable adjustable time delay means such as a differentiating circuit whose constants are variable. The delay time L is made adjustable between 0.2 microsecond and 6 microseconds in the particular example being described.

The write waveform generator 5 provides at its output terminals 29 and 30 two, anti-phase, output waveforms whose form is determined by the nature of the input machine-type signal from gate device 3 and suitable for controlling the required energisation of the recording head coil winding 12 to set up the special form of magnetization pattern already referred to. The version of the two antiphase outputs available from the generator 5 at terminal 29 and as necessary to record a signal representing the binary number 1011 (read from left to right) and as illustrated in Fig. 5(*d*) is shown in Fig. 5(*h*). The other waveform at terminal 30 is, of course, merely an inverse version of this.

The two outputs from terminals 29, 30 of the write waveform generator 5 are applied respectively to input terminals 129, 130 of a write unit 7 whose form will be described in detail later and by which the required energising current is supplied from its output terminals 111 and 112 to the primary winding of the transformer T1. Such write unit 7 is constructed so that its output may be suppressed except when an appropriate control potential is applied to terminal 113 by way of lead 114 from a write control unit 8. Such write control unit, whose form will also be described in detail later, serves to provide a control potential which will allow the write unit 5 to operate for a chosen period equal to and coincident with one complete cycle of the store 2. For this purpose such write control unit is controlled by two separate input waveforms one of which is the aforesaid counterwaveform fed over lead 115 to terminal 116 from the counterwaveform generator 10 and the other of which is an initiating potential supplied over lead 117 to terminal 118 from a source 9. In addition to controlling the write unit 7, the write control unit 8 supplies a further output to terminal 11 for use in inhibiting the production of control signals for synchronising the rotation of the drum 17 which is otherwise continuously synchronised with the operating rhythm of the store 2 in the manner described in the aforementioned U. S. A. Patent No. 2,652,554 (app. Ser. No. 146,445) to F. C. Williams et al.

Assuming that a recording already exists in the recording layer 16 of the drum 17, an output or reproduced signal in winding 14 is applied to the primary winding of a transformer T2 and the output from the secondary winding of the latter feeds a pre-amplifier 18. This pre-amplifier supplies its output over lead 119 to the input terminal 120 of a read unit 19 whose form will be described in detail later and which serves to convert the amplified output signals derived from the winding 14 back into equivalent machine-type signals for subsequent transmission from its output terminal 121 over lead 122 to a gate device 21 and from thence over lead 123 to the write input terminal 101 of store 2. The gate 21 is of the coincidence type resembling the gate 3 and is provided with a control input terminal 124 supplied over lead 125 from a source 22 of control voltage so that only when a suitable control voltage is derived from such source 22 are the signals, which are normally being continuously developed in the read unit 19, applied to the store 2. For the purpose of ensuring that the signals developed in the read unit 19 under the control of the output from the reproducing winding 14, are strictly in synchronism with the operating rhythm or digit signalling speed of the store 2, such read unit 19 is supplied by way of input terminals 126, 127 with the two paraphase versions of the dash waveform from the dash waveform generator 20.

The coil windings 12 and 14 may each comprise a single turn interlinking their respective magnetic flux circuits which are each arranged as shown to concentrate their respective external fluxes across gaps, of which that associated with the reproducing winding is positioned ahead of that associated with recording winding (when viewed from the standpoint of the moving recording track T on layer 16) by an amount S (Fig. 1).

A more detailed description of the actual recording of pulse signals representing digital information as magnetisation patterns on a recording medium and the subsequent reproduction of these pulse signals will now be given with reference to Figures 2 and 3.

An enlarged cross-sectional view of the recording head elements is shown in Figure 2(*a*) and a similar view of the reproducing or pick-up head elements is shown in Figure 2(*b*). Due to minor irregularities in the periphery of the drum 17 it is impracticable to set the recording head elements closer to the recording layer 16 than as shown to scale in Figures 2(*a*) and 2(*b*). The path of flux lines passing between the poles of the recording head is shown at 15 in Figure 2(*a*) while a plan view of the disposition of a typical recorded magnetization pattern is shown at 15 in Figure 2(*b*) from which it can be seen that as the recording medium is moving relative to the heads in the direction of the arrows *x* the polarization direction of magnetization will lie substantially in a circumferential direction.

Due to the finite thickness of the gap-defining elements of the heads, the finite width of the gap and the spatial disposition of the gap elements with respect to the recording medium the distribution of the magnetic field strength along the recording medium is approximately as shown by the curve 25 shown in Figure 2(*c*) for the instant when the recording head is in the mean position 24 shown.

Similar considerations apply to the gap-defining elements of the pick-up head so that when a pick-up head has a mean position 26 shown in Figure 2(*b*) with respect to the magnetization pattern 15 which undergoes a complete reversal along the line 28, the flux induced in the pick-up head is as shown approximately by the curve 27 in Figure 2(*d*). The actual voltage induced in a wire interlinked with the pick-up head will be proportional to the rate of change of flux in the pick-up head and examination of the curve 27 will show that this rate of change is proportional to the magnitude of the flux at the reversal position wherever that may be. Thus the shape of the voltage waveform would be in the form of an isosceles triangle having its maximum value when the position 28 of the magnetisation reversal was in line with the mean position 26 of the pick-up head.

Fig. 3(*a*) shows the current waveform which is applied to the recording head winding in order to lay down magnetization patterns according to the invention which are representative of a train of four binary digits 1 0 1 1. The currents flow in a positive sense when the waveform is shown above and in a negative sense when shown below a zero current level indicated by the zero lines in the figures and the state of magnetization of the recording medium will vary in a substantially similar manner subject to the limitations discussed in connection with Fig. 2. Fig. 3(*b*) shows the corresponding voltage waveform which will (theoretically) be induced in a pick-up head past which is being moved a medium upon which the magnetization pattern produced by the waveform of Fig. 3(*a*) has been laid down.

In the waveform of Fig. 3(*a*) the current flow in a positive direction during any and every digit interval is balanced by an equal current flow in a negative direction. This permits the use of pulse transformers for supplying the current to the recording heads which is preferable to the use of blocking oscillators or like circuits for supplying unbalanced current waveforms.

The actual magnetization pattern laid down on the magnetic recording medium will depend upon the spread of the magnetic field strength set up along the recording medium on either side of the mean position of the recording head. The waveform shown in Fig. 3(*b*) has been drawn for clearness on the assumption that there is no interference between adjacent voltage responses in the pick-up head. A greater signal may be obtained by increasing the magnetic field strength of the recording but this cannot be continued indefinitely as the spread of the field will start to cancel out adjacent voltage peaks of opposite polarity. There is thus an optimum spread of the magnetic field strength and in practice the apparatus is designed to produce this. Under this condition, a practical voltage response to the input current waveform shown in Figure 3(*a*) is as shown in Figure 3(*c*) and is practically sinusoidal in character.

It has so far been assumed that the magnetic recording layer 16 is capable of retaining a magnetization pattern laid down on it for an indefinite period of time or until a different pattern of magnetization is laid down. This requires the recording medium to have the property of allowing each discrete element or domain of magnetization to retain its magnetic orientation in spite of the influence of adjacent domains, but under the influence of a current in the writing head to take up a new orientation irrespective of the old. It is also necessary for the layer 15 to be homogeneous and adhere to the metal surface of the drum at the high peripheral speeds involved. In addition the magnetic layer must not be influenced by any external magnetic fields such as the braking field employed on the surface of the drum in order to synchronise the rotation of the drum as described in the aforesaid U. S. A. Patent No. 2,652,554 (application Ser. No. 146,445, filed February 27, 1950) by F. C. Williams et al.

Although a number of magnetic alloys and magnetic oxides have been investigated, the only material which has been found in practice to fulfil all these requirements is pure nickel which is capable of storing magnetization patterns representing over 100 digits per inch length of track. The nickel is deposited on the drum in a controlled layer 0.001 inch thick. An even distribution is obtained by rotating the drum in the plating tanks and precautions are also taken chemically to avoid pitting of the nickel in any way.

A detailed description will now be given of the various units of the writing circuit shown in Fig. 1.

Referring to Fig. 4 the gate circuit 3 comprises two thermionic valves V2, V3 having their cathodes interconnected and joined to the output terminal 105. The control grid of valve V2 is connected to the input terminal 103 by which the machine-type pulse signals arrive from the store 2 while the control grid of the opposite valve V3 is connected to the input terminal 104 by which the control voltage from the source 4 is applied. The two valves are arranged in a cathode-follower type circuit, the cathode load of which is provided by certain elements within the write waveform generator 5 referred to later. The lower potential end of such cathode load is effectively connected to the source of negative potential −150 v. as are also the suppressor grids of the valves V2 and V3. The anode and screen grid of each valve are strapped together and are connected directly to the source of positive potential +200 v. while the control grid of each valve is connected by way of a leak resistance to earth.

In explaining the operation of this gate circuit it will be assumed that the machine-type signal pulse train of Fig. 5(*d*) is applied to the input terminal 103 from the store 2 while the potential derived from the control voltage source 4 will be assumed to be one which is at +5 v. when no digit signals are required to be written into the magnetic storage device and which is at an appreciable negative voltage when such signals are required to be written into the store. While the control voltage input from source 4 is at +5 v. the common cathode point of the two valves and terminal 105 will be held at a similar voltage of about +5 v. and in consequence the negative-going digit-pulses in the signal applied to valve V2 from the store 2 will not be transmitted to the output terminal 105. Such circuit is, effectively, a well known type of coincidence gate circuit in which either valve is capable of supplying the maximum current flow which can take place through the common cathode load impedance.

When the voltage from source 4 is taken negative, i. e. to allow signal transmission through the gate device, valve V3 is cut off at its control grid and in consequence valve V2 will be turned on whilst the input machine-type pulse signal is at its +5 v. resting level and will be cut off during the time of each of the negative-going "1"-representing digit pulses. When valve V2 is thus cut off the common cathode point of the two valves will fall to a similar negative voltage level and in consequence a replica of the input signals from store 2 will be provided at the output terminal 105.

The write waveform generator 5 comprises a two-stable-state trigger circuit constituted by valves V4 and V5 which are pentodes cross-connected by direct-current paths between their respective anodes and control grids. The two cathodes are each earthed while their anodes are each connected to the source of positive potential +300 v. by way of a separate anode load resistance; the screen grids of the valves are likewise each connected to such positive potential source +300 v. by way of individual voltage dropping resistances. In the usual way such a circuit may rest in either one of two stable states where one valve or the other is cut off and the opposite valve turned full on. Triggering of the circuit from the condition where valve V4 is on and valve V5 is off to the opposite condition where valve V5 is on and valve V4 is off may be effected by the application of a negative-going triggering pulse through a diode D5 whose anode is connected to the control grid of valve V4. Similarly the trigger circuit may be changed over from the condition where valve V5 is on and valve V4 is off to the opposite condition where valve V5 is off and valve V4 is on by a negative-going triggering pulse applied through diode D6 whose anode is connected to the control grid of valve V5. The control grid of each valve V4, V5 is separately connected by way of a leak resistance R4, R5 to the source of negative potential −150 v. A further triggering input for the circuit of valves V4, V5 is provided from the point *z* by way of the diodes D10, D11 whose anodes are connected respectively to the anodes of valves V4 and V5. Such alternative triggering input is of the well known circuit-reversing type whereby any negative-going pulse at the point *z* will serve to reverse the condition of the circuit of valves V4, V5 regardless of the particular condition in which such valve-pair previously existed. Thus if valve V4 is on and valve V5 is off the next negative pulse at point *z* will reverse the circuit to the state where valve V4 is off and valve V5 is on while the next following negative pulse will again reverse the circuit to the state where valve V4 is on and valve V5 is off.

The triggering input through diode D5 is associated with a coincidence gate circuit constituted by diodes D3 and D4. The interconnected cathodes of the diodes D3 and D4 are connected to a load resistance R3 whose opposite end is connected to the source of negative potential −150 v.; such common cathode point is also connected to the cathode of the diode D5. The anode of diode D4 is supplied directly with the output signal from the gate circuit 3 by way of the terminal 107 while the anode of diode D3 is connected to the anode of a valve V1 whose function will be described later. Similarly the triggering input through diode D6 is associated with another coincidence gate circuit constituted by diodes D7 and D8. These two diodes also have their cathodes interconnected and joined to the cathode of diode D6 and also by way of a load resistance R7 to the source of negative potential −150 v. The anode of diode D8 is, like that of diode D3, connected to the anode of valve V1 still to be described, while the anode of diode D7 is supplied by way of a cathode follower stage 44 from an inverter circuit 43 whose input is also supplied from the terminal 107 which receives the output from gate 3. The inverter circuit may be of any suitable type such as a normal thermionic valve having an input to its control grid and an output from its anode while the cathode follower 44 is also entirely of conventional form.

The input terminal 109 which receives the digit square waveform from the digit square wave generator 6 is connected by way of capacitor C45 to the point *z* common to the diodes D10 and D11 and also by way of capacitor C47 to the control grid of valve V1. Capacitor C45 is associated with the resistance R46 connected to a source of positive potential +50 v. so as to form a differentiating circuit. Similarly capacitor C47 is associated with a resistance R48 connected to the source of negative potential −150 v. to constitute a further differentiating circuit. The cathode of valve V1 is connected by way of a load resistance R1 to the source of negative potential −150 v. and also by way of a further resistance R2 to earth. The two resistances R1, R2 form a potentiometer by which the cathode of valve V1 is normally biased to approximately −130 v. whereby the control grid of valve V1, which is connected to the source −150 v. through resistance R48 is effectively provided with a −20 v. bias voltage which cuts the valve V1 off. The anode of the valve is connected by way of a load resistance R6 to the source of positive potential +300 v. and is also directly to the anodes of diodes D3 and D8.

The anode of valve V1 is additionally connected to the anode of a diode D1 whose cathode is joined to a source of positive potential +5 v. whereby the anode voltage of valve V1 can fall below but cannot rise above +5 v.

The signal output from the anode of valve V4 is supplied by way of a capacitance C4 to the control grid of a valve V6 which is arranged as a cathode follower having the opposite end of its cathode load resistance R30 connected to the source of negative potential −150 v. and its anode connected directly to the source of positive potential +200 v. The cathode output point of valve V6 is directly connected to the output terminal 30. The control grid of the valve V6 is connected by way of a leak resistance to the source of potential +100 v., such leak resistance being shunted by a diode D14 whose anode is connected to the control grid line and whose cathode is connected to the source of positive potential +100 v. Such diode D14 effectively prevents the control grid of valve V6 from rising above +100 v. but, of course, allows such control grid potential to fall as may be required below such voltage level.

The anode of valve V5 is similarly connected to a further identically arranged cathode follower circuit including valve V7 capacitor C5 and load resistor R29, the cathode output of valve V7 being connected to the output terminal 29 and diode D13 forming an equivalent of the diode D14 to limit the rise of potential at the control grid of the valve to +100 v.

The operation of this write waveform generator is as follows: The digit square waveform of Fig. 5(*a*) applied to terminal 109 is differentiated by the network of capacitor C47 and resistance R48 and applied to the control grid of valve V1. As valve V1 is normally cut off by the 20 v. negative bias voltage between its cathode and control grid only the differentiated positive-going pulses provided by the leading edges of each of the pulses of the digit square waveform are effective to turn on the valve V1 for the short period of each pulse and in consequence the anode output of valve V1 comprises a series of negative-going pulses coincident one with each leading edge of the positive pulses of the digit square waveform as illustrated in Fig. 5(*b*). The same digit square waveform of Fig. 5(*a*), after differentiation by the network of capacitor C45 and resistance R46 is applied from the point *z* to each of the anodes of the valves V4, V5. As the positive-going pulses of the differentiated digit square waveform are effectively blocked by the diodes D10, D11, the pulse waveform available at each of the anodes of valves V4, V5 is that shown in Fig. 5(*c*) comprising a negative-going pulse coincident with each of the trailing edges of the positive pulses of the digit square waveform. It should be noted that the pulses of the grid trigger waveform of Fig. 5(*b*) each occur after the delay time L measured from the Beginning of each digit-interval *p* of the machine rhythm while the triggering pulses of the anode trigger waveform of Fig. 5(*c*) occur at an interval after such commencement of each digit-interval equal to the delay time L plus half the digit-interval, i. e. $L+5$ microseconds in the particular example being described.

Assuming that the machine-type signal shown in Fig. 5(*d*) is applied to the input terminal 107 from the gate circuit 3 as already referred to, then during the first digit-interval which contains a "1"-representing digit pulse in the machine signal, the anode of diode D4 will be driven negative for the 6 microsecond period of the digit pulse whereas, due to the action of the inverter 43, the anode of diode D7 will be held positive. In consequence, the pulse of the grid trigger waveform of Fig. 5(*b*), which occurs after the delay time L during such "1"-digit pulse signal, will pass only through diode D3 to diode D5 and valve V4 as shown in Fig. 5(*e*) and will be blocked from passage to diode D6 and valve V5 as shown in Fig. 5(*g*). If the trigger circuit was previously in the condition where valve V5 was on and valve V4 off it will be unaffected but if, on the other hand, the trigger circuit was previously in the opposite condition with valve V4 on and valve V5 off then its condition will be changed to that where valve V4 is off and valve V5 is on. In this condition the anode potential of valve V4 will be high and that of valve V5 low and corresponding output voltages will occur at terminals 30 and 29. Fig. 5(*h*) shows that at terminal 29. Such outputs, through the intermediary of the write unit 7 cause energisation of the winding 12 of the head 13 to produce magnetization of the track T which is polarized in a first direction.

Such state continues until the arrival, 5 microseconds later, of the first pulse of the anode trigger waveform, Fig. 5(*c*) at point *z* whereupon the trigger circuit of valves V4, V5 is immediately reversed in its condition to one in which valve V5 is cut off and valve V4 is turned on. The respective outputs at terminals 29, 30 are accordingly reversed together with the resultant polarization direction of the magnetization produced in the track T. This is illustrated in Fig. 5(*i*) the point of abrupt reversal *r* of the polarization to a second opposite direction during the second portion *b* of the discrete length *d* being that which marks the reversal of the trigger circuit of valves V4, V5 by the pulse of the anode trigger waveform of Fig. 5(*c*). Such abrupt reversal point, it will be noted occurs at the time $L+5$ microseconds after the instant of commencement of the related digit-interval *p* of the machine rhythm. Such delay, which is adjustable as already stated, is used to compensate for a phase advance which occurs in the reproducing arrangements as described later.

In the next digit-interval *p*, the binary digit value is "0" and there is no pulse in the machine-type pulse signal train, Fig. 5(*d*). In consequence, the input from gate 3 at terminal 107 will be at +5 v. and diode D4 will have its anode at a similar potential. Due to the action of the inverter circuit 43 the anode of diode D7 will be driven negative however so that, upon the arrival of the next pulse of the grid trigger waveform Fig. 5(*b*) it will be passed to valve V5 and will be blocked from valve V4 as shown in Figs. 5(*g*) and 5(*e*) respectively. As valve V5 is already cut-off due to the previous operation at the abrupt reversal point *r*, the trigger circuit condition is unchanged and the output potentials at terminals 29, 30 and the polarization direction of the track magnetization remain unaltered whereby the first portion *a* of the discrete length *d* assigned to this second digit is polarized in said second direction. 5 microseconds later the next pulse of the anode trigger waveform reverses the state of the circuit of valves V4, V5 to alter the output potentials at terminals 29, 30 and thus to effect abrupt reversal of polarization direction of the magnetization of track T to the aforesaid first direction during the ensuing second portion *b* of the discrete length *d*. Had the trigger circuit of valves V4, V5 not been in the correct state at the time of application of the grid trigger pulse through diode D6, then the trigger circuit would have been reversed at this time and then reversed again at the time of the following anode trigger pulse. This would have occurred if the preceding digit signal value was similar instead of dis-similar and an example of this kind of operation can be seen in connection with the last two digits (1, 1) of the machine-type signal.

Referring now to Fig. 6, the write unit 7 comprises two output valves V14, V15 arranged as a push-pull amplifier having the respective antiphase outputs from terminals 29, 30 of the write waveform generator 5 applied through terminals 129 and 130 to the control grids of valves V14 and V15 respectively. The anode of each valve is connected to an opposite end of the primary winding of a transformer T3. A centre tap on such primary winding is connected to a source of positive potential +600 v. The secondary winding of the transformer T3 is connected to the output terminals 111 and 112 which feed the transformer T1 supplying the winding 12 of the recording head. As shown in this figure provision may be made for the supply of the output from transformer T3 to any one of a number of separate transformers T1 each energizing an individual recording head. Selection of an appropriate one of the transformers T1 for energisation and consequent recording in a selected one out of plurality of separate recording tracks T is effected by switching means indicated generally at SM.

The cathodes of valves V14 and V15 are interconnected and joined to the anode of a valve V16 which operates as a "tail" valve whose cathode is connected to earth and whose control grid is connected to terminal 113 which receives a control voltage from the write control unit 8. The control grid of valve V16 is also connected by way of a leak resistance R16 to the source of negative potential −150 v.

In the operation of this write unit 7 the control potential supplied to terminal 113 is normally sufficiently negative to cut-off valve V16 whereby neither valve V14 or V15 passes space current and no current flows in either half of the primary winding of transformer T3 regardless of any input waveform which may be supplied to terminals 129 and 130. When recording is to take place, the potential supplied to terminal 113 is raised to a level which will turn valve V16 on whereupon current will flow through one or the other but not both of the valves V14, V15 according to the nature of the respective antiphase waveforms which are applied to terminals 129 and 130. Thus when the waveform applied to terminal 129 is positive and that applied to terminal 130 is negative then valve V14 is turned on and current will flow through the left-hand half of the primary winding of transformer T3 to provide an output current to the connected transformer T1 such as will produce an energising current in one direction through the winding 12 of the associated recording head to set up magnetization in the recording track which is polarized in one of the two directions. Upon reversal of the respective input waveforms at terminals 129 and 130 valve V14 is turned off and valve V15 is turned on whereby current flows through the right-hand half of transformer T3 with consequent reversal of the direction of current flow in the associated coil 12 of the recording head to cause the magnetization of the track to be polarized in the opposite direction. The drive transformer T3 and the head transformer T1 are each designed to be voltage step-down devices. The transformer T1 is conveniently situated in the block on which the recording head 13 is mounted. The transformer T1 is necessary because the impedance of the winding 12 is about 0.01 ohm and if this was connected directly to the transformer T3 its resistance would be small compared with that of the leads interconnecting it with the transformer. Using a 10:3 ratio for the miniature head transformer T1 matched with the drive transformer it is possible to get currents of 25 amperes amplitude in the recording head. Efficient matching is obtained when each half of the primary winding of the transformer T3 is of 250 turns and 4 turns are provided on the secondary winding, thus giving an overall ratio of 208:1. An effective impedance of 430 ohms is thus produced in the anode circuit of the driving valves V14 and V15 for a head winding impedance of 0.01 ohm.

The two ends of the secondary winding of the drive transformer T3 may also, instead of being taken direct to a chosen one of a plurality of transformers T1 as shown in Figure 6, be taken to the moving contacts of a relay through which the output of transformer T3 could alternatively be fed to a dummy head consisting of an equivalent miniature transformer, the primary being connected to the relay contacts and the secondary to a measured length of thin copper wire having a reistance equal to that of the head winding and connected between earth and a monitoring point. The write current could then when required be passed through the dummy head and the current pulse examined by observing the voltage waveform at the monitoring point.

The surface view of the orientation of the magnetization pattern on a recording track produced by antiphase voltage waveforms which are the same as and the inverse of that shown in Figure 5(*h*) is shown diagrammatically in Figure 5(*i*).

Employing the push-pull amplifier writing unit just described it is possible for the current in the write head to settle down to its correct mean value within a digit interval. If however a single power amplifier valve is used to feed the drive transformer T3 numerous difficulties arise due to its unbalanced construction. The valve would be cut off in its rest condition by the application of a negative bias to its grid. When the valve is switched on there would be an initial period before the mean level of the applied waveform is reached on the grid due to the inductive coupling in the anode of the valve behaving as an A. C. coupling with a definite time constant determined by the characteristics of the transformer and its load. This initial period in practice would extend over several digit intervals so that the first few digits would be defectively recorded.

The form of the write control unit is also illustrated in Fig. 6 and comprises a conventional two-stable-state trigger circuit 31 consisting of a pair of thermionic valves V10, V11 cross-connected in the usual way. A triggering input for placing the circuit in a condition where valve V10 is turned off and valve V11 is turned on is derived through input terminal 118 from the source 9 by way of lead 117. The source 9 conveniently provides a short duration negative pulse which is applied whenever it is desired to commence a transfer of digital information from the store 2 to the magnetic storage device. Such pulses may conveniently be derived by differentiating a sudden change in voltage level such as that occasioned by the closing of a manually operated key. The grid of valve V11 of circuit 31 is continuously supplied with a series of negative pulses derived by differentiating the output waveform from the counter waveform generator 10 and applying such negative pulses over lead 115 to terminal 116. As already explained such counter waveform generator output comprises a square wave whose period time is equal to that of one complete operative cycle of the store 2 and in consequence a negative pulse will be delivered to valve V11 at the commencement of each of said operative cycles. As explained in the aforesaid U. S. Patent No. 2,652,554 granted September 15, 1953 (application Ser. No. 146,445, filed February 27, 1950) the drum 16 is constrained to rotate in synchronism with the store whereby it completes one revolution during the same period. The trigger circuit 31 is thus supplied with a reset pulse at the commencement of each revolution of the drum.

A second two-valve trigger circuit 32 also of the two-stable-state type and comprising valves V12 and V13 cross-connected in the usual way, has the triggering input to the control grid of valve V12 supplied from the anode of valve V10 of the trigger circuit 31. The voltage at the control grid of valve V12 is also fed to a cathode follower circuit 33 whose output is applied directly to the terminal 11, which feeds the synchronising device as previously referred to, and also by way of an inverter circuit 34 and lead 114 to the input terminal 113 of the write unit 7. The opposite valve V13 of the trigger circuit 32 is supplied, like valve V11, with negative pulses derived from the counter waveform generator 10.

The operation of this write control unit is as follows. In the absence of any requirement to effect transfer from the store 2 to the magnetic drum 17 the continuous supply of negative pulses from the counter waveform generator 10 to valve V11 of trigger circuit 31 and to valve V13 of trigger circuit 32 ensures that such trigger circuits are both maintained in the state where valve V11 and valve V13 are both off and the opposite valves V10 and V12 respectively are turned on. In consequence the voltage of the grid of valve V12 is at its raised level of about earth potential and this is applied through the cathode follower stage 33 to the inverter 34 which accordingly supplies a negative-going output potential to terminal 113 of the write unit 7 thereby holding valve V16 of the latter cut off. The raised or positive-going output potential from the cathode follower 33 is at the same time supplied to terminal 11 for allowing operation of the associated drum synchronising means.

Upon a requirement to commence a signal transfer from store 2 to magnetic drum 17 a negative-going pulse from source 9 is applied by lead 117 and input terminal 118 to reverse the state of trigger circuit 31 so that valve V10 is cut off and valve V11 is turned on. This reversal has no immediate effect upon the trigger circuit 32 but upon the arrival of the next negative pulse from the counter waveform generator 10 the trigger circuit 31 will be reset again to the state where valve V11 is turned off and valve V10 is turned on. The resultant fall in potential at the anode of valve V10 is differentiated and used to provide a negative trigger pulse for valve V12 whereby trigger circuit 32 is reversed to the condition where valve V12 is turned off and valve V13 is turned on. The grid of valve V12 is at this time driven negative and this negative potential is applied to the cathode follower 33 whereby the output potential at terminal 11 is likewise lowered to inhibit operation of the synchronising arrangements for the drum 17 and whereby, at the same time, the output potential from the inverter 34 is raised to cause the turning on of valve V16 of the write unit 7. The write unit 7 is thus rendered operative and continues to remain in this state to effect transference of signals supplied from the store 2 in the manner previously described. Upon the arrival of the next pulse from waveform generator 10 at the end of one complete operation cycle of store 2, the trigger circuit 32 will be reset by the turning off of valve V13 and the consequent turning on of valve V12. The rise of grid voltage at valve V12 then produces a resumption of the original conditions where the output from terminal 11 is raised and the output from the inverter 34 is lowered again to cut off valve V16 of write unit 7. A further transfer can be initiated only by the application of another pulse input from source 9 to input terminal 118. It will be noted that trigger circuits 31 and 32 are each provided with a negative resetting pulse at the instant of commencement of a transfer but that applied to trigger circuit 32 is arranged so that it does not cancel the effect of the pulse applied from trigger circuit 31 to valve V12 by making the pulse from trigger circuit 31 of longer duration than that of the pulse from the counter waveform generator 10.

Before a detailed description of the reproducing or reading circuits is given the inter-relationship between the reading and writing heads will be discussed with reference to Figures 5 and 8. As previously described and illustrated in Figure 5 magnetization pattern representing the binary number 1 0 1 1 laid down on the recording medium as shown in Figure 5(*i*) is arranged to be "L" micro-seconds later than the train of machine-type pulse signals shown in Figure 5(*d*) that it represents. This magnetization pattern is redrawn in Figure 8(*a*). The voltage waveform induced in the reading coil 14 of the associated recording/reproducing head 13 which is cooperating with this particular recording track is shown in Figure 8(*b*). This waveform is derived in a manner already explained in connection with Figures 3(*a*), 3(*b*) and 3(*c*). The pattern of magnetization chosen is one which is arranged to produce a signal characteristic of the digit (i. e. the abrupt reversal of polarization direction) in the middle of the related discrete portion of the track assigned to the recording of that digit. Examination of Figure 8(*b*) reveals that the biggest margin of discrimination does occur in the middle of the digit period when the voltage waveform is at a negative peak when the digit represented is a "1" and the waveform is at a positive peak when the digit represented is a "0." This voltage produced by the reading head is thus sampled at the middle of the digit periods by a train of strobe or marker pulses as shown in Figure 8(*d*). An indication of the nature of a digit is therefore not given until the middle of the digit period so that the reproduced train of digit signals shown in Figure 8(*f*) occurs half a digit period later than the time that the magnetization pattern shown in Figure 8(*a*) moves past the reading head. It will thus be seen that the reproduced train of digit signals occurs $(L+5)$ micro-seconds later than the original train of digit signals shown in Figure 5(*d*) fed into the writing circuits assuming that the digit period is 10 micro-seconds and assuming that the magnetization pattern passes the reading head at an instant in the cyclic operation of the machine corresponding to the instant that the pattern passes the writing head. This is only possible when the same head is used for writing and reading, and as separate heads are used for writing and reading in order to counterbalance the $(L+5)$ micro-seconds delay together with any delay "D" micro-seconds occurring in the reading circuit amplifiers, the writing head is arranged to lie ahead of the reading head in the path of the recorded track a distance "S" as shown in Figure 1. This distance is fixed so that patterns of magnetization on the recording drum are arranged to pass the reading head $(L+5+D)$ micro-seconds before they pass the writing head by adjusting the delay "L" micro-seconds as previously described.

Referring now to Fig. 7 which illustrates in detail the form of the read unit 19 and its interconnection with the associated reproducing coil 14, it will be seen that two reproducing channels are illustrated corresponding to the two recording channels shown in Fig. 6.

Each reproducing coil winding 14A, 14B is connected to the primary winding of its own head transformer T2A and T2B. The secondary winding of each head transformer is connected to the input terminals of an individual pre-amplifier 18A, 18B which is of conventional form except for the provision of means, not shown, for applying a blocking bias voltage to one or more valves thereof. The output from each pre-amplifier 18A is supplied to a common busbar 125 to which is also connected the input terminal of an amplifier 50. By supplying a blocking bias voltage to each pre-amplifier except that related to the reproducing channel required, only one out of a number of separate reproducing heads may be selected for operation at one time.

Each of the transformers T2A, T2B are of miniature form and provided with a step-up transformation ratio. They are located close to the associated head 13 in a similar manner to the writing transformers T1. Each preamplifier consists of a high turns ratio step-up input transformer feeding an amplifier valve. The secondary of this transformer may be broadly tuned to 100 kcs./sec. as the fundamental frequency of the signal is 100 kcs./sec. and 50 kcs./sec. when a signal indicative of a "1" follows one indicative of a "0" and vice versa. A certain amount of phase control is provided by detuning the resonant circuit which is useful to balance out slight phase variations between the read signals from different read coils 14A, 14B in a block.

The amplifier 50 is of conventional form comprising a number of valve amplifying stages whereby its output signal has an amplitude of the order of 20 v. while still retaining the near-sine waveform shown in Fig. 8(*b*). Such amplifier output may have undergone a further delay of "D" micro-seconds which has been ignored in Fig. 8(*b*).

The amplifier output is applied to the input terminal 120 of the read unit 19. Such read unit comprises a first thermionic valve V21 which is a pentode having its cathode connected to earth by way of bias resistor R52 (4.7 kilo-ohms) and its control grid connected to the input terminal 120 by way of resistor R51 (4.7 kilo-ohms). The anode of the valve is connected by way of a load resistance to the source of positive potential +300 v. while the anode output is applied through capacitor C54 (0.1 microfarad) to the control grid of the next thermionic valve V22. A Miller-type feedback network between the anode and control grid of valve V21 is also provided comprising a potentiometer network of resistors R53 (100 kilo-ohms) and R55 (4.7 kilo-ohms) connected between the anode of valve V21 and the control grid end of capacitor C54 together with two diodes D20 and D21. The anode of diode D20 and cathode of diode D21 are interconnected and joined to the control grid of valve V21 while the cathode of diode D20 is connected to the junction of resistors R53 and R55. The anode of diode D21 is connected to the common point of resistor R55 and capacitor C54 and also by way of a resistor to a source of negative potential −150 v.

The second valve V22 is arranged as a conventional gated amplifier valve having an earthed cathode and an anode load and with its suppressor grid connected directly to the anode of a further valve V23. Such suppressor grid is also joined to one terminal of a germanium crystal rectifier G1, the other terminal of which is earthed. The further valve V23 has its cathode connected to a source of negative potential −150 v. while its anode is connected by way of a load resistance to the source of positive potential +300 v. as is also its screen grid. The control grid of valve V23 is connected by way of a series resistor to the junction point between a resistor R57 (150 kilo-ohms) and a capacitor C56 (56 micro-micro farads). The resistor R57 is joined at its other end of the source of positive potential +300 v. while the opposite terminal of the capacitor C56 is connected to terminal 126 which receives one version of the dash waveform, Fig. 8(*d*) from the generator 20.

The anode output from amplifier stage V22 is supplied to the cathode of a diode D22 which is arranged in series with a further diode D23 whose anode is connected to the anode of a further thermionic valve V24. The cathode of diode D22 is connected by way of a second germanium crystal rectifier G2 to a source of positive potential +50 v. while the interconnected anode of diode D22 and cathode of diode D23 is connected to one terminal of a capacitor C58 (56 micro-micro farads) whose other terminal is earthed and is also connected to the anode of a cathode follower stage 59 whose output is applied to output terminal 121.

The further valve V24 has its cathode and suppressor grid connected directly to earth while its control grid is supplied through terminal 127 with the opposite phase version of the dash waveform from generator 20. The anode of valve V24 is connected by way of a load resistor to the source of positive potential +300 v.

The operation of this read unit is as follows.

The input signal at terminal 120 is applied through resistor R51 to the control grid of valve V21 which squares this voltage waveform so that the voltage waveform shown in Figure 8(*c*) is produced at the point 50 for application to the control grid of the valve V22. This transformation is carried out in the following manner.

The bias resistor R52 in the cathode of valve V21 establishes a positive potential on the cathode. Consider the amplifier connected end of resistor R51 to be taken negative. The control grid will tend to go negative and therefore the anode voltage of the valve V21 will rise positively. This positive rise will be transmitted back to the grid through the feed-back resistor R53, resistor R55 and 0.1 microfarad capacitor C54 so that the change of grid voltage will be compensated and the grid voltage will be held within the grid base of the valve. A current will therefore flow through the resistor R51 from the grid to the amplifier coupled end. This current must flow through the diode D21 so that the anode of D21 will be held at the grid potential which approximates to the cathode potential of valve V21. Therefore when the applied voltage from the amplifier goes negative about the mean level of the input waveform then the output voltage is held only very slightly positive. When the input voltage is positive then exactly same feed-back action occurs but through diode D20 instead of diode D21. The cathode of D20 is therefore held at cathode potential. The potential at the tapping point 60 is therefore held at 7 volts more negative due to the constant voltage drop across the resistor R55 in the chain. Therefore when the input from the amplifier 50 is positive relative to the mean level of the input wave form then a voltage of −7 v. is produced at the output point 60. This effect is illustrated in Figure 8(*c*), assuming that the output from the amplifier 50 is in antiphase to the waveform shown in Figure 8(*b*). The slope of the change-over edges of the waveform is finite in practice due to the non-ideal characteristics of the diodes D20 and D21.

This voltage waveform of Fig. 8(*c*) is applied to the grid of valve V22. The suppressor grid of this valve is switched by a fine strobe or marker pulse shown in Figure 5(*c*) which is generated in valve V23 in the following manner. The dash waveform shown in Figure 8(*d*) applied to terminal 126 is differentiated by the capacitor C56 and resistor R57 and is applied to the control grid of valve V23 which cuts the valve off for a very short period of less than 1 micro-seconds duration at the beginning of the digit period. A positive going pulse is thus produced on the anode and applied to the suppressor grid of valve V22, being caught by a germanium crystal G1 at earth potential. Valve V22 is therefore only allowed to pass anode current for a short period at the beginning of each digit period. If the control grid of valve V22 is positive when the strobe pulse is applied then the potential on its anode is reduced to as low a value as possible for the duration of the strobe pulse. If the grid is negative then the anode remains at +50 volts, caught by the crystal G2. A negative spike produced on the anode of valve V22 pulls the capacitor C58 down to +10 volts through the diode D22. The capacitor C58 remains at this potential until it is pulled back to the +50 volts level by the negative dash waveform generated in valve V24. The condenser capacitor voltage is fed to the cathode follower circuit 59. The resultant action of the strobing mechanism is that a positive level at the grid of valve V22 during a strobe instant produces a 6 micro-seconds negative pulse at the output, while a negative level leaves the output signals unchanged. The resultant output signal obtained is shown in Figure 8(*f*) and is a reproduction of the input signal to the writing circuits shown in Figure 5(*d*) but relatively delayed ($L+5$) micro-seconds.

It is of course desirable for the strobe to lie in the centre of the positive and negative levels of the squared signal as illustrated in Figures 8(*c*) and 8(*e*). There is a 2.5 micro-seconds tolerance on either side of the strobe when the system is adjusted in this fashion so that any temporary displacement of the phasing such as that caused by a writing operation will be covered.

The train of digit signals having the wave form shown in Figure 8(*f*) is fed from the cathode follower 59 to the gate circuit 21 which allows the signals to pass through to the store 2 on application of a gating voltage from the source 22 as described in connection with Figure 1. The gate circuit 21 can be similar to the gate circuit 3 shown in and described in connection with Figure 4.

It will be understood that the storage system of the present invention is not restricted to the recording of the particular form of binary data signal information as in the particular embodiment described but that information carried by any discrete sequential electrical signals which are of such a form that they may have either one of two significances may be recorded in a similar manner to the information which is contained in a pulse wave of the type illustrated in Fig. 5(*f*).

I claim:

1. A magnetic storage system for storing electrical signals of two different kinds which comprises a member having a magnetic recording medium, an electromagnetic recording head having a winding energisable by electric current in either of two directions to set up magnetization of said recording medium which is polarized parallel to the direction of movement of said medium relative to said head in either a first direction or a second opposite direction dependent upon the direction of flow of said energising current through said winding, a source of energising current for said recording winding and signal-controlled switching means between said source of current and said winding for governing the direction of energising current flow therethrough, said switching means being controlled by an applied signal which is to be stored so as to be conditioned to produce an initial period of magnetization polarized in a first direction for one kind of signal and in a second direction for the other kind of signal and being reversed automatically to conclude the recording of said signal by polarization in said second direction for said first kind of signal and in said first direction for said second kind of signal.

2. A magnetic storage system for storing electrical pulse train signals which comprises a rotatable drum having a magnetic recording medium therearound, an electromagnetic recording head energisable by electric current in either of a first or a second sense to set up magnetization of said recording medium which is polarized parallel to the direction of movement of said medium relative to said head in either a first direction when energised in said first sense or in a second opposite direction when energised in said second sense, a source of energising current for said recording head and signal controlled switching means between said source of current and said recording head for governing the sense of energisation of said head, said switching means being controlled by an applied signal to be conditioned to produce magnetization polarized in a first direction in the presence of a pulse in said pulse train and in a second direction in the absence of a pulse in said pulse train and being reversed automatically to conclude the recording of said signal by polarization in said second direction in the presence of a pulse and in said first direction in the absence of a pulse.

3. A magnetic storage system for storing electrical signals of two different kinds comprising an elongated element of magnetic recording material, electrically energised magnetizing means disposed adjacent said recording material, means for producing relative motion between said magnetizing means and said recording material, a source of energising current for said magnetizing means to produce magnetization in a direction parallel with said direction of relative motion and polarized in one or the other of two mutually opposite directions in dependence upon the direction of current flow in said magnetizing means, electrically operated polarity reversing switch means between said source of current and said energised magnetizing means, electric signal sensing means for examining an applied electric signal to determine which kind of signal is existent at any instant and providing an output signal characteristic of said applied signal and means for applying said output signal to said switching means to produce a direction of current flow through said magnetizing means which is in a first direction for one kind of signal and in a second direction for the other kind of signal and further means for reversing said switching means after a predetermined time interval to produce magnetization of a polarization in said second direction for said first kind of signal and in said first direction for said second kind of signal.

4. A magnetic storage system for storing electrical pulse signal trains representing binary numbers by the provision of a pulse to indicate binary value "1" and the absence of a pulse to indicate binary value "0," comprising an elongated element of magnetic recording material, an electromagnetic recording head disposed adjacent said recording material, means for producing relative motion between said recording head and said recording material, a source of energising direct-current for said magnetizing means to produce magnetization in a direction parallel with said direction of relative motion and polarized in one or the other of two mutually opposite directions in dependence upon the direction of current flow in said magnetizing means, electrically operated polarity reversing switch means between said source of current and said energized magnetizing means, electric signal sensing means for examining an applied electric signal to determine the presence or absence of a pulse signal at predetermined instants and providing an output signal indicating the result of said examination and means for applying said output signal to operate said switching means to produce a direction of current flow through said magnetizing means which is in a first direction when the examined signal has a pulse, and in a second direction when the examined signal has no pulse and further means for reversing said switching means after a predetermined time interval to produce magnetization of a polarization in said second direction when the examined signal has a pulse and in said first direction when the examined signal has no pulse.

5. A magnetic storage system for electrical signals of two different kinds and comprising a magnetic recording medium having an elongated recording track, electrically energised recording means for producing magnetization of said track, means for producing relative movement between said recording medium and said recording means whereby a discrete length of said track is assigned to the recording of each of said signals, a source of energising direct-current for said recording means to produce magnetization in said track polarized in one or other of two directions parallel with the direction of relative movement in dependence upon the direction of current flow in said recording means, signal-operated switching means for controlling the direction of current flow from said source through said recording means, electric signal sensing means for examining said applied electrical signals to determine the kind thereof which is instantaneously present, said sensing means providing an output signal which is indicative of said kind, means for applying said output signal to said switching means to control the direction of current flow through said energised recording means in dependence upon said kind and a source of switch reversing signals occurring subsequently to said controlling signals for reversing said switching means to reverse the direction of polarization of said magnetization in said discrete length of track.

6. A magnetic storage system for storing electrical signals of two different kinds and comprising a magnetic recording medium on the curved surface of a rotating drum, at least one recording head for writing signals onto said drum so that they are stored as predetermined states of magnetization along discrete lengths of a track of said curved surface, such magnetization being polarized in a direction parallel with the direction of movement of said track, writing circuits responsive to said electrical signals to produce an electric current for energising said recording head, said electric current being initially in one direction to produce one direction of polarization with one kind of signal and in the opposite direction to produce an opposite direction of polarization for said other kind of signal and timed current reversing means for reversing said direction of current flow and said direction of polarization at a predetermined instant during the period of magnetic recording devoted to any one signal.

7. A magnetic recording system for an electronic binary digital computing machine operating with serial mode pulse train signals and which comprises a rotating drum having a peripheral magnetic recording surface therearound, at least one stationary electromagnetic recording head disposed adjacent said recording surface, a two-stable-state trigger circuit having a first triggering input for altering its state from a first state to a second state, a second triggering input for altering its state from said second state to said first state and a common triggering input for reversing its state from one state to the opposite state at any time, current supply means controlled by output potentials from said trigger circuit for energising said recording head in a first direction when said trigger circuit is in its first state to effect magnetization of said recording surface polarized in a first direction parallel to the direction of movement of such surface and in the second opposite direction when said trigger circuit is in its second state to effect magnetization of said recording surface polarized in a second and opposite direction parallel to the direction of movement of such surface, a first source of timing signals occurring in synchronized relation to the digit-intervals of the signal pulse trains of said computing machine, a second source of triggering signals also synchronised to said computing machine and delayed with respect to said first source of signals, gate circuit means controlled by each digit signal from said computing machine for passing said first trigger signals to one or the other of said first or second triggering input terminals of said trigger circuit in dependence upon the binary value of such digit signal and means for supplying said second source of trigger signals directly to said reversing input of said trigger circuit.

8. A magnetic recording system for an electronic binary digital computing machine operating with serial mode pulse train signals wherein one binary value is signalled by the presence of a digit pulse within any digit interval and the other binary value by the absence of such a digit pulse within any digit interval and which comprises a rotating drum having a peripheral magnetic recording surface therearound, at least one stationary electromagnetic recording head disposed adjacent said recording surface, at least one stationary electromagnetic reproducing head disposed adjacent said recording surface in a position in advance of said recording head relative to the direction of motion of said drum, a two-stable-state trigger circuit having a first triggering input for altering its state from a first state to a second state, a second triggering input for altering its state from said second state to said first state and a common triggering input for reversing its state from one state to the opposite state at any time, current supply means controlled by output potentials from said trigger circuit for energising said recording head in a first direction when said trigger circuit is in its first state to effect magnetization of said surface polarized in a first direction parallel to the direction of movement of such surface and in the second opposite direction when said trigger circuit is in its second state to effect magnetization of said surface polarized in a second opposite direction, a source of timing signals occurring in synchronised relation to the digit-intervals of the signal pulse trains of said computing machine, a second source of triggering signals also synchronised to said computing machine and delayed with respect to said first source of signals, gate circuit means controlled by each digit signal from said computing machine for passing said first trigger signals to one or the other of said first or second triggering input terminals of said trigger circuit in dependence upon the presence or absence of a digit pulse in each digit-interval of such digit signal, means for supplying said second source of trigger signals directly to said reversing input of said trigger circuit to reverse the polarization of the magnetization of such recording surface during the recording of each digit of the machine signal, a source of control signals resembling and in synchronism with the digit pulses of said machine pulse signals, means for deriving output signals from said reproducing head, signal examining means for examining said output signals from said reproducing head to determine their polarity at instants coincident with the reproduction of the regions of magnetization reversals by said second source of trigger signals and gate circuit means controlled by said signal examining means for passing a pulse of said control signal to said machine when said examined signal is of one polarity and suppressing said pulse when said examined signal is of opposite polarity.

References Cited in the file of this patent

UNITED STATES PATENTS

| | | |
|---|---|---|
| 1,972,228 | Kauffmann | Sept. 4, 1934 |
| 2,303,840 | James | Dec. 1, 1942 |
| 2,378,389 | Begun | June 19, 1945 |
| 2,436,829 | Roth | Mar. 2, 1948 |
| 2,443,756 | Williams et al. | June 22, 1948 |
| 2,539,009 | Chaney et al. | Jan. 23, 1951 |
| 2,540,654 | Cohen et al. | Feb. 6, 1951 |
| 2,564,403 | May | Aug. 14, 1951 |
| 2,594,731 | Connolly | Apr. 29, 1952 |
| 2,609,143 | Stibitz | Sept. 2, 1952 |
| 2,611,813 | Sharpless | Sept. 23, 1952 |

FOREIGN PATENTS

| | | |
|---|---|---|
| 978,883 | France | Apr. 19, 1951 |

OTHER REFERENCES

A Magnetic Digital Storage System, A. D. Booth, Electronic Engineering, July 1949, pages 234–238.